(12) United States Patent
Byrne et al.

(10) Patent No.: US 10,894,275 B2
(45) Date of Patent: Jan. 19, 2021

(54) VEHICLE CAMERA WITH LENS HEATER AND WASHER SYSTEM

(71) Applicant: MAGNA ELECTRONICS INC., Auburn Hills, MI (US)

(72) Inventors: Steven V. Byrne, Goodrich, MI (US); Jonathan D. Conger, Berkley, MI (US); Jamie A. Mleczko, Washington, MI (US); Rene Dreiocker, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 205 days.

(21) Appl. No.: 15/874,919

(22) Filed: Jan. 19, 2018

(65) Prior Publication Data

US 2018/0207691 A1 Jul. 26, 2018

Related U.S. Application Data

(60) Provisional application No. 62/448,609, filed on Jan. 20, 2017.

(51) Int. Cl.
*B08B 7/04* (2006.01)
*B60S 1/02* (2006.01)
(Continued)

(52) U.S. Cl.
CPC ............... *B08B 7/04* (2013.01); *B08B 3/02* (2013.01); *B08B 17/02* (2013.01); *B60R 11/04* (2013.01); *B60S 1/026* (2013.01); *B60S 1/46* (2013.01); *B60S 1/52* (2013.01); *B60S 1/56* (2013.01); *G02B 27/0006* (2013.01); *H05B 3/84* (2013.01); *B08B 7/0071* (2013.01); *B60R 2011/004* (2013.01)

(58) Field of Classification Search
CPC .... B06S 1/026; B06S 1/46; B06S 1/48; B06S 1/481; B06S 1/488; B06S 1/56; G02B 27/0006
See application file for complete search history.

(56) References Cited

U.S. PATENT DOCUMENTS 4,157,161 A 6/1979 Bauer
4,967,437 A * 11/1990 Morse ................... B60S 1/3805
15/250.07

(Continued)

FOREIGN PATENT DOCUMENTS

EP 2949521 A1 12/2015
JP 2007053448 A 3/2007
WO 2012138455 A1 10/2012

*Primary Examiner* — Spencer E Bell
(74) *Attorney, Agent, or Firm* — Honigman LLP

(57) ABSTRACT

A camera assembly for a vision system for a vehicle includes a camera module configured to be disposed at an exterior portion of the vehicle so as to have a field of view exterior of the vehicle. The camera module includes a housing and a lens barrel supporting a lens. A heating device is configured to attach at an exterior of the lens barrel. The heating device includes a heating element that at least partially circumscribes the lens barrel when the heating device is attached at the lens barrel. The heating device includes an electrical lead configured to electrically connect to an electrical connector of the vehicle when the camera module is disposed at the exterior portion of the vehicle.

20 Claims, 4 Drawing Sheets

(51) Int. Cl.
- *B60R 11/04* (2006.01)
- *H05B 3/84* (2006.01)
- *B08B 3/02* (2006.01)
- *B60S 1/46* (2006.01)
- *B08B 17/02* (2006.01)
- *G02B 27/00* (2006.01)
- *B60S 1/56* (2006.01)
- *B60S 1/52* (2006.01)
- *B08B 7/00* (2006.01)
- *B60R 11/00* (2006.01)

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,554,210 B2 | 4/2003 | Holt et al. |
| 6,719,215 B2 | 4/2004 | Drouillard |
| 6,944,908 B2 | 9/2005 | Hoetzer et al. |
| 7,014,131 B2 | 3/2006 | Berning et al. |
| 7,267,290 B2 | 9/2007 | Gopalan et al. |
| 7,480,149 B2 | 1/2009 | DeWard et al. |
| 7,532,233 B2 | 5/2009 | Chu |
| 7,965,336 B2 | 6/2011 | Bingle et al. |
| 8,542,451 B2 | 9/2013 | Lu et al. |
| 8,567,963 B1 | 10/2013 | Criscuolo et al. |
| 8,671,504 B2 | 3/2014 | Ono et al. |
| 9,327,689 B2 | 5/2016 | Kikuta et al. |
| 9,645,392 B2 | 5/2017 | Yoshimura |
| 2003/0090569 A1 | 5/2003 | Poechmueller |
| 2004/0189831 A1 | 9/2004 | Shibatani et al. |
| 2007/0132610 A1 | 6/2007 | Guemalec et al. |
| 2007/0273971 A1 | 11/2007 | Waldmann et al. |
| 2009/0244361 A1 | 10/2009 | Gebauer et al. |
| 2009/0250533 A1 | 10/2009 | Akiyama et al. |
| 2011/0073142 A1 | 3/2011 | Hattori et al. |
| 2011/0266375 A1 | 11/2011 | Ono et al. |
| 2011/0292212 A1 | 12/2011 | Tanabe et al. |
| 2012/0117745 A1 | 5/2012 | Hattori et al. |
| 2012/0243093 A1 | 9/2012 | Tonar et al. |
| 2013/0092758 A1 | 4/2013 | Tanaka et al. |
| 2013/0146577 A1 | 6/2013 | Haig et al. |
| 2013/0255023 A1 | 10/2013 | Kikuta et al. |
| 2013/0300869 A1 | 11/2013 | Lu et al. |
| 2013/0319486 A1 | 12/2013 | Kikuta et al. |
| 2014/0060582 A1* | 3/2014 | Hartranft ............... B60R 11/04 134/18 |
| 2014/0104426 A1 | 4/2014 | Boegel et al. |
| 2014/0232869 A1 | 8/2014 | May et al. |
| 2015/0138357 A1 | 5/2015 | Romack et al. |
| 2015/0183404 A1 | 7/2015 | Romack et al. |
| 2015/0321621 A1 | 11/2015 | Van Dan Elzen et al. |
| 2015/0327398 A1 | 11/2015 | Achenbach et al. |
| 2015/0344001 A1* | 12/2015 | Lopez Galera ........... B60S 1/56 134/198 |
| 2016/0103316 A1* | 4/2016 | Rousseau .................. B60R 1/00 359/509 |
| 2016/0264064 A1 | 9/2016 | Byrne et al. |
| 2016/0272163 A1 | 9/2016 | Dreiocker et al. |
| 2019/0299938 A1* | 10/2019 | Deegan .................... B60S 1/56 |

* cited by examiner

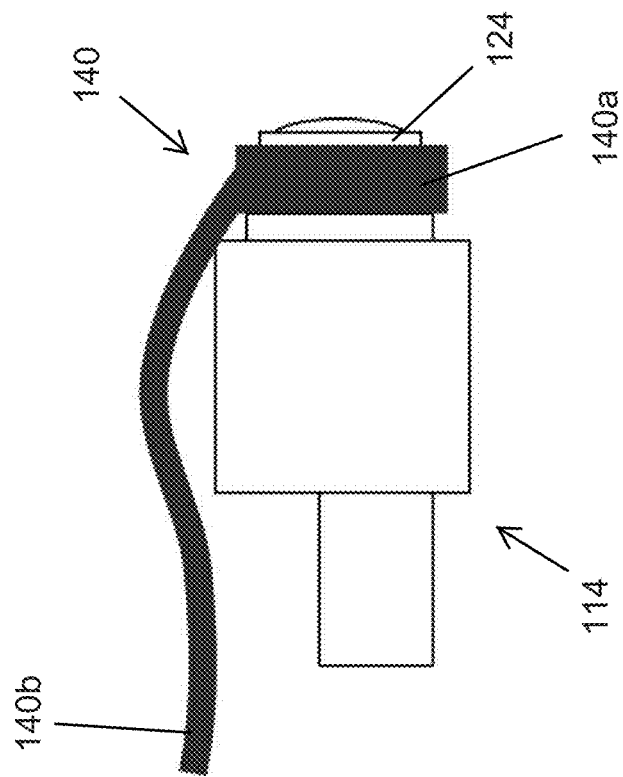
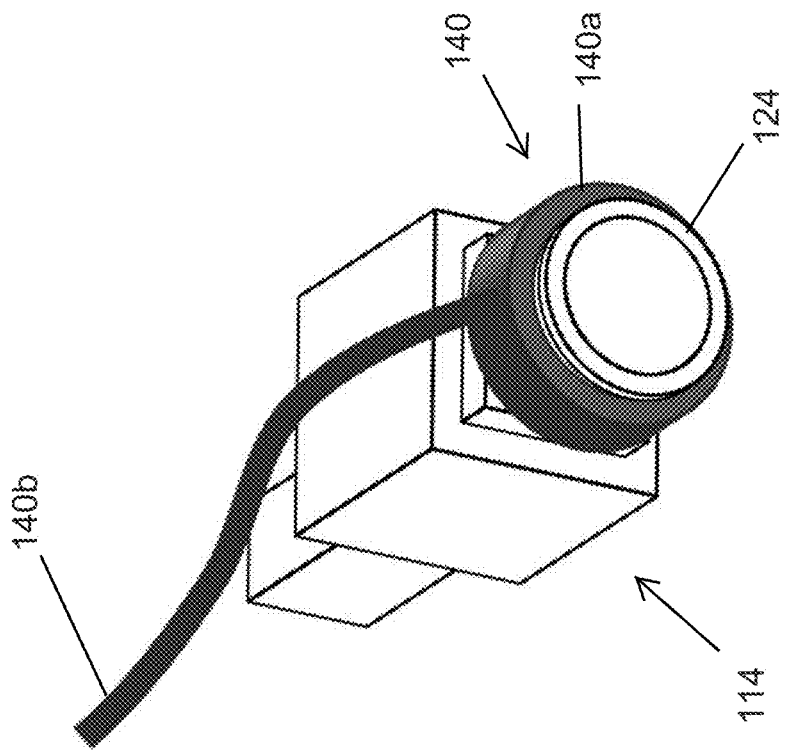

VEHICLE CAMERA WITH LENS HEATER AND WASHER SYSTEM

CROSS REFERENCE TO RELATED APPLICATION

The present application claims the filing benefits of U.S. provisional application Ser. No. 62/448,609, filed Jan. 20, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

Obscuring view by mud, salt or dust is becoming an increasing issue for vehicle cameras as their ability to determine and recognize objects can be limited or interrupted. Vehicle manufacturers have recently started to add washer nozzles mounted at the vehicle in close proximity to the camera lens. These washer nozzles spray a high pressure stream of water onto the lens when activated, thus cleaning the lens within a short amount of time. Typically, the camera washer is integrated into the existing windshield washer system and is activated through the same pump.

For some unique applications, a lens heating function may be included within some cameras to defog the elements when needed. This function is typically very expensive and it is difficult to assemble the heating element inside of the camera. Such a heating function typically requires an entirely different camera design that is larger and must have additional connection circuits. The production assembly processes would be unique, more manually intensive and costly.

SUMMARY OF THE INVENTION

The present invention provides a vision system or imaging system for a vehicle that utilizes one or more cameras (preferably one or more CMOS cameras) to capture image data representative of images exterior of the vehicle, and provides a heating element attachment to heat the lens of the camera, and optionally a lens washer attachment that provides pressurized fluid at the camera lens. The camera may be mounted or disposed at an exterior structure of the vehicle, such as, for example, a vehicle panel, grill, bumper, fascia, light bar, center high mounted stop lamp (CHMSL) or the like, with its lens viewing exterior of the vehicle. The heating element attachment comprises a separate element that snap attaches at the lens barrel such that, when snap attached, the heating element at least partially circumscribes the lens barrel. The lens washer attachment may comprise a separate element that snap attaches at the lens barrel and/or at the camera housing such that, when snap attached, the nozzle end is directed at the outer surface of the lens of the camera.

These and other objects, advantages, purposes and features of the present invention will become apparent upon review of the following specification in conjunction with the drawings.

BRIEF DESCRIPTION OF THE DRAWINGS

FIG. 4 is a perspective view of a camera and heating device, shown with the heating device attached at the lens barrel of the camera housing;

FIG. 5 is a side elevation of the camera of FIG. 4;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
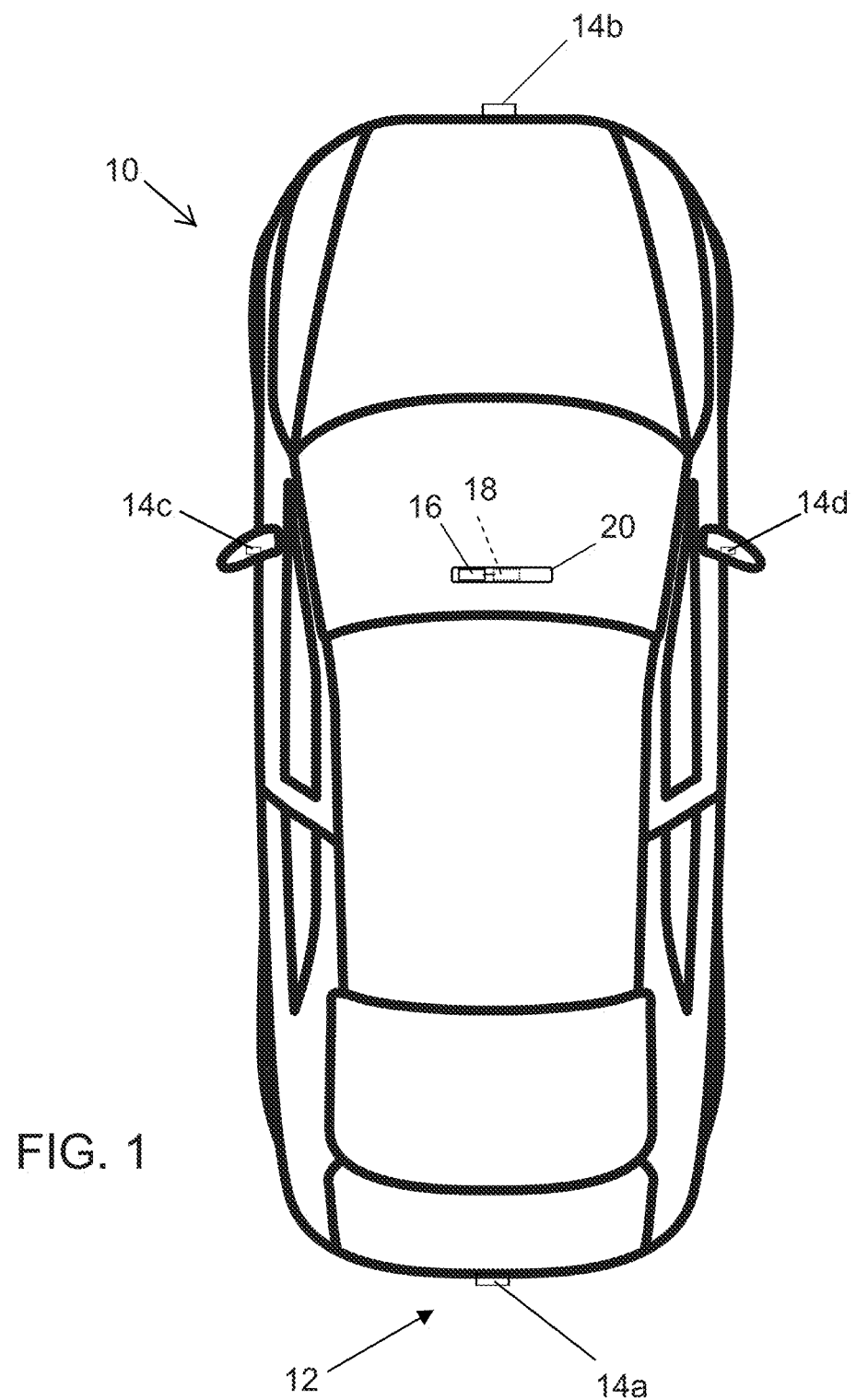
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The cameras each include a housing and imager and a lens that is oriented such that the camera views exterior of the vehicle. Such automotive camera lenses are susceptible to dirt or debris collecting at the lens of the camera. This is particularly an issue for cameras mounted at the front of a vehicle, such as at a front bumper or grill or fascia of the vehicle. Also, because the camera is disposed at the vehicle exterior, such cameras are exposed to cold temperatures and temperature and humidity fluctuations, whereby moisture and/or ice or snow may form at the lens.

Figure 3:
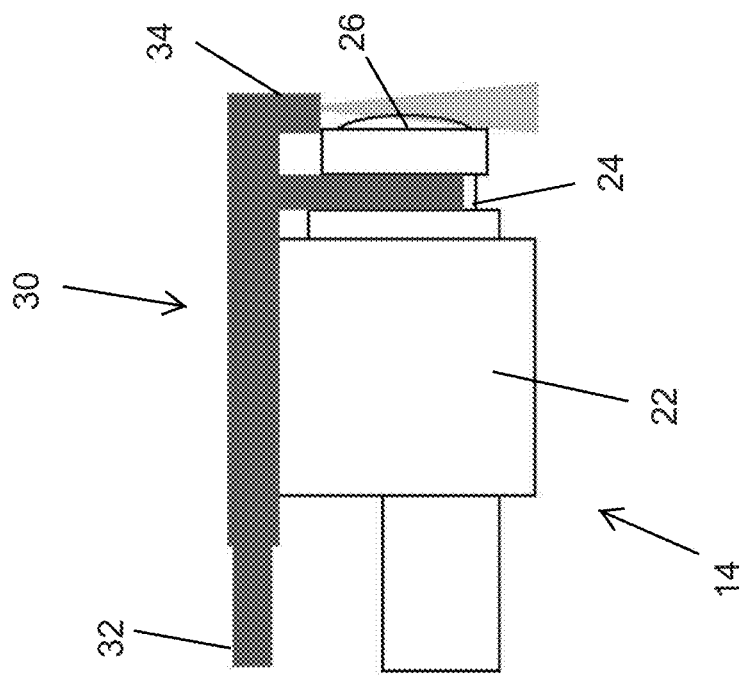
FIG. 3 is a side elevation of the camera of FIG. 2.
Figure 2:
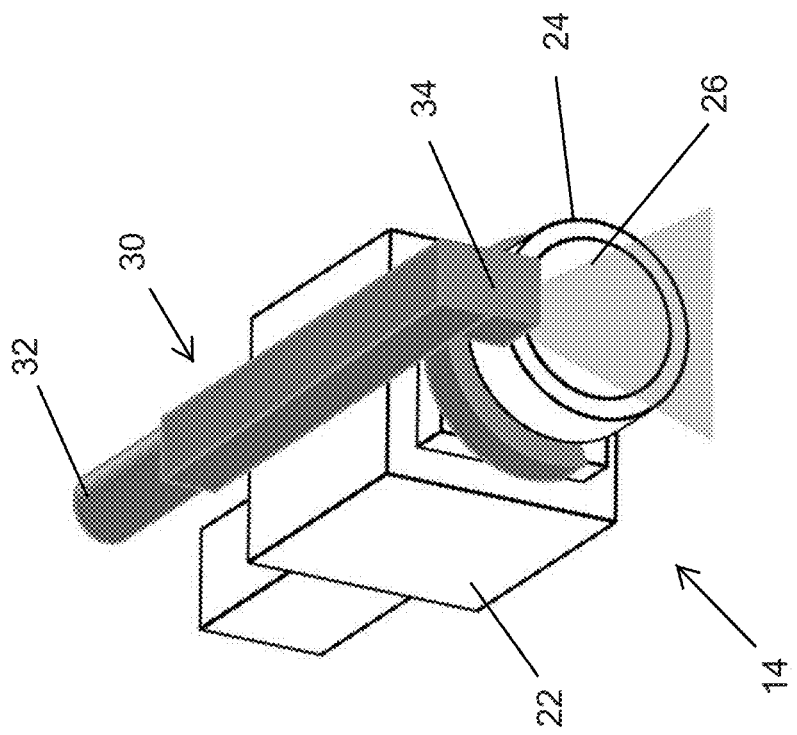
FIG. 2 is a perspective view of a camera and washer, shown with the washer attached at the lens barrel of the camera housing.

The camera may include a lens washer attachment or system, such as by utilizing aspects of the lens washers described in U.S. Publication Nos. US-2016-0272163 and/or US-2016-0264064, which are hereby incorporated herein by reference in their entireties. For example, and such as shown in FIGS. 2 and 3, a camera 14 (such as the front or forward viewing camera or a side or rear camera) includes a housing portion 22 and a lens barrel 24 that supports a lens 26. A washer attachment 30 is configured to snap attach at the lens barrel 24. The washer 30 is configured to provide a fluid passageway or channel through and along which pressurized fluid flows, such as described in U.S. Publication No. US-2016-0272163. The washer 30 includes a flow channel or passageway extending between a hose connector end 32 and a nozzle end 34. The washer body 30 also includes a clip element 36 that is configured to snap attach at the lens barrel 24 to retain the washer 30 at the camera 14.

With reference to FIGS. 4 and 5, a camera 114 includes an externally attached heating device 140 which can be slipped over the lens barrel 124 and/or clipped on in a similar manner as the washer 30 of FIGS. 2 and 3. The heating device 140 comprises a band or loop portion 140a and an electrical connector 140b (such as an electrical lead or wire that is configured to electrically connect to a vehicle electrical connector or wire harness). The band or loop portion 140a is electrically connected to the electrical connector and includes heatable elements, such as a resistive metal conductor that heats when an electrical current is applied thereto.

Thus, for a camera that is selected to have a heating function (such as selected by the vehicle manufacturer), the heating device 40 is provided and attached to the lens barrel of the camera (such as a standard exterior vehicle camera), whereby the band portion 140a at least partially circumscribes the lens barrel 124 so as to heat the lens barrel (and lens optics disposed therein) when the heating device is powered. In the illustrated embodiment, the band portion circumscribes the lens barrel, and the heating device may be attached at the lens barrel by sliding the band portion onto and longitudinally along the lens barrel, where the band portion may be retained thereat via a press fit attachment or via any suitable attachment means, such as a retention clip or tab or the like disposed at the band portion and/or lens barrel. Optionally, the band portion may comprise an elastic or resilient material (with the electrically conducting elements disposed in a zig-zag configuration) so as to allow for stretching or expanding of the band portion to position it at the lens barrel, whereby, when released, the resilient material retracts to retain the band portion and electrically conducting elements at the lens barrel.

Figure 7:
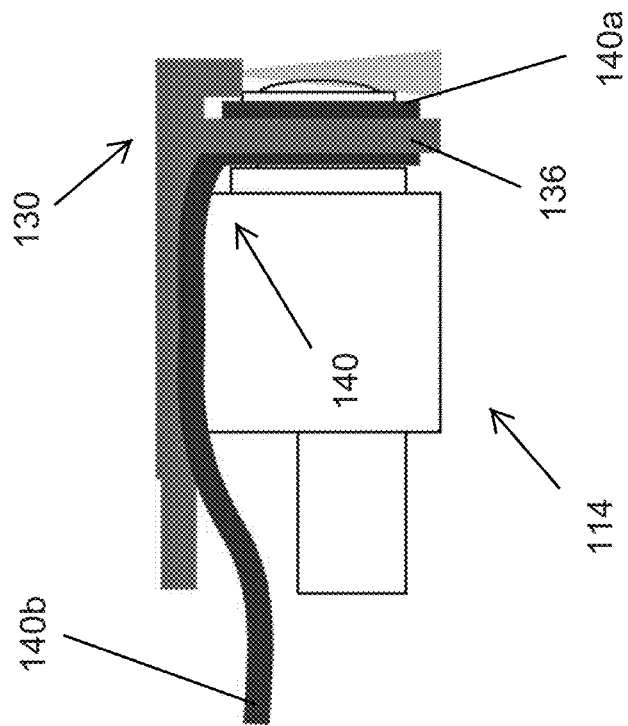
FIG. 7 is a side elevation of the camera of FIG. 6.
Figure 6:
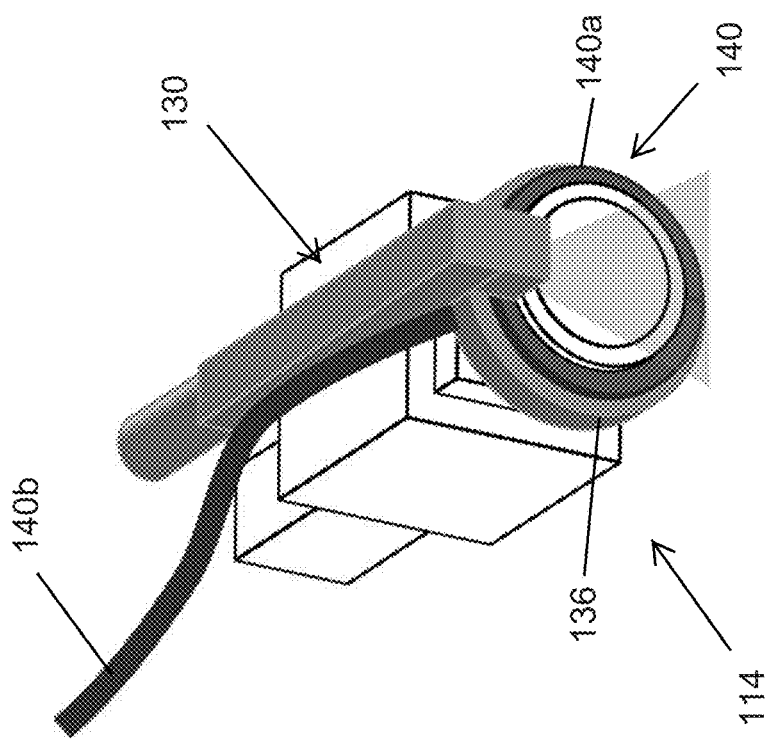
FIG. 6 is a perspective view of a camera and heating device and washer, shown with the heating device and washer attached at the lens barrel of the camera housing.

Optionally, and such as shown in FIGS. 6 and 7, a heating device 140 may be provided or included as part of an externally attached washer device or system 130 disposed at a lens barrel and lens of a camera 114. In such a configuration, the heating portion or elements or ring portion 140a may be disposed in or on the clip portion 136 of the washer device 130, and the electrical wiring or lead 140b may be disposed along the body of the washer, such that the electrical connection and fluid supply connection may be made at a similar location when the camera is installed at the vehicle.

The heating elements or circuits could be directly attached to a vehicle harness or be integrated into a camera pigtail if included in the design. As with a washer system, activation and control of the unit would be way of messages from the camera to the vehicle's communications network. Control could also be included in this device by way of integrated temperature sensor and timer. For example, a temperature sensor may be included such that, when the sensed temperature drops below a threshold temperature, the heating device is automatically activated to heat the lens barrel to limit or preclude moisture or ice forming on the lens optics. Control within the device could even act as a redundant safety control in unison with the vehicle's to meet ISO 26262 international functional safety standards for such systems.

Thus, the present invention provides a heating system (and optionally a washer system too) that can be attached at a camera (such as at and at least partially or entirely around a lens barrel of the camera) for heating the lens. The heating system and/or washer system thus may be selected for and added to a vehicle camera, depending on the application of the camera, without any modifications to the camera itself.

Optionally, the camera or vision system of the present invention may include a temperature sensor at the camera to determine a temperature of the camera, such as during operation of the camera or when the camera is exposed to decreased temperatures. The system may monitor the temperature at the camera and, responsive to the temperature being below a threshold level, the system may activate the heater to heat the lens. Optionally, the system may also or otherwise, such as responsive to the temperature being above a higher temperature threshold, activate the washer at the camera to flow fluid through cooling channels of the camera housing to reduce the temperature of the camera. The flowing fluid may also spray onto the camera and the lens to cool the camera and clean the lens of the camera. Thus, the system may actively heat or cool the camera thermally via the heater system and washer system whereby a temperature monitoring circuit in or at the camera triggers the heater system or the washer system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, which are all hereby incorporated herein by reference in their entireties. The camera or cameras may comprise any suitable cameras or imaging sensors or camera modules, and may utilize aspects of the cameras or sensors described in U.S. Publication Nos. US-2015-0327398 and/or US-2009-0244361 and/or U.S. Pat. Nos. 8,542,451; 7,965,336 and/or 7,480,149, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera assembly for a vision system for a vehicle, said camera assembly comprising:
   a camera module configured to be disposed at an exterior portion of a vehicle so as to have a field of view exterior of the vehicle, said camera module comprising a housing and a lens barrel supporting a lens;
   a heating device configured to attach at an exterior of said lens barrel, said heating device comprising a heating element that circumscribes said lens barrel when said heating device is attached at said lens barrel;
   wherein said heating element comprises a band portion having at least one electrically conducting element disposed therein, and wherein said band portion comprises an elastic material that allows for expansion of said band portion to position said band portion at said lens barrel, and wherein, when said band portion is positioned at said lens barrel and released, said band portion retracts to retain said heating element at said lens barrel; and
   wherein said heating device includes an electrical lead configured to electrically connect to an electrical connector of the vehicle when said heating device is attached at said lens barrel and when said camera module is disposed at the exterior portion of the vehicle.

2. The camera assembly of claim 1, wherein said camera module is configured to be fixedly mounted at the exterior portion of the vehicle.

3. The camera assembly of claim 2, wherein, with said camera module mounted at the exterior portion of the vehicle, said lens is exposed at the exterior portion of the vehicle.

4. The camera assembly of claim 1, wherein said at least one electrically conducting element is disposed in said band portion of said heating device in a zig-zag configuration that allows for expansion of said band portion to position said band portion at said lens barrel.

5. The camera assembly of claim 1, wherein said band portion, when expanded, receives said lens barrel therein and is slid longitudinally along said lens barrel to attach said heating device at said lens barrel.

6. The camera assembly of claim 1, comprising a washer having a connector and fluid passageway, wherein said washer is configured to be detachably attached at said camera module when said camera module is disposed at the exterior portion of the vehicle, and wherein, with said washer attached at said camera module and said camera module disposed at the exterior portion of the vehicle, said connector is configured for connection to a washer system of a vehicle such that, when the vehicle washer system is actuated, pressurized fluid flows through said fluid passageway and onto said lens.

7. The camera assembly of claim 6, wherein an outlet is formed at said washer at an end of said fluid passageway, and wherein, with said washer attached at said camera module, said outlet is disposed at or near an exterior surface of said lens, and wherein said outlet is configured to spray pressurized fluid onto the exterior surface of said lens.

8. The camera assembly of claim 6, wherein said washer comprises a clip element that is configured to snap attach at said lens barrel of said camera module to detachably attach said washer at said camera module.

9. The camera assembly of claim 8, wherein said heating device is integrated as part of said washer such that, with said washer attached at said lens barrel, said heating element circumscribes said lens barrel.

10. The camera assembly of claim 6, wherein said washer comprises a clip element that is configured to snap attach at said heating device when said heating device is attached at said lens barrel of said camera module.

11. The camera assembly of claim 1, comprising a temperature sensor for sensing a temperature at said camera module, wherein, responsive to an output of said temperature sensor that is indicative of the temperature at said camera module being below a lower threshold level, a control operates said heating device to increase the temperature of said lens barrel of said camera module.

12. The camera assembly of claim 11, comprising a washer that, when a vehicle washer system is actuated, receives pressurized fluid and sprays fluid onto said lens, and wherein, responsive to an output of said temperature sensor that is indicative of the temperature at said camera module being above an upper threshold level that is greater than the lower threshold level, the control operates the washer system of the vehicle to flow fluid through the washer and/or through at least one fluid channel of said camera module to reduce the temperature of said camera module.

13. A camera assembly for a vision system for a vehicle, said camera assembly comprising:
   a camera module configured to be disposed at an exterior portion of a vehicle so as to have a field of view exterior of the vehicle, said camera module comprising a housing and a lens barrel supporting a lens;
   wherein, with said camera module mounted at the exterior portion of the vehicle, said lens is exposed at the exterior portion of the vehicle;
   a heating device configured to attach at an exterior of said lens barrel, said heating device comprising a heating element that at least partially circumscribes said lens barrel when said heating device is attached at said lens barrel;
   wherein said heating device includes an electrical lead configured to electrically connect to an electrical connector of the vehicle when said heating device is attached at said lens barrel and when said camera module is disposed at the exterior portion of the vehicle;
   wherein said heating element comprises a band portion having at least one electrically conducting element disposed therein, and wherein said band portion comprises an elastic material that allows for expansion of said band portion to position said band portion at said lens barrel, and wherein, when said band portion is positioned at said lens barrel and released, said band portion retracts to retain said heating element at said lens barrel;
   a washer having a connector and fluid passageway, wherein said washer is configured to be detachably attached at said camera module when said camera module is disposed at the exterior portion of the vehicle, and wherein, with said washer attached at said camera module and said camera module disposed at the exterior portion of the vehicle, said connector is configured for connection to a washer system of a vehicle such that, when the vehicle washer system is actuated, pressurized fluid flows through said fluid passageway and onto said lens;
   wherein said camera assembly comprises an integrated temperature sensor that generates an output indicative of temperature at said camera assembly; and
   a control that controls said heating device and said washer at least in part responsive to the output of said integrated temperature sensor.

14. The camera assembly of claim 13, wherein said heating device snap attaches at said lens barrel.

15. The camera assembly of claim 13, wherein said heating device comprises a loop portion that receives said lens barrel therein and is slid longitudinally along said lens barrel to attach said heating device at said lens barrel.

16. The camera assembly of claim 13, wherein said washer comprises a clip element that is configured to snap attach at said lens barrel of said camera module to detachably attach said washer at said camera module.

17. The camera assembly of claim 13, wherein said heating device is integrated as part of said washer such that, with said washer attached at said lens barrel, said heating element at least partially circumscribes said lens barrel.

18. The camera assembly of claim 13, wherein said washer comprises a clip element that is configured to snap attach at said heating device when said heating device is attached at said lens barrel of said camera module.

19. A vision system for a vehicle, said vision system comprising:
   a camera module configured to be disposed at an exterior portion of a vehicle so as to have a field of view exterior of the vehicle, said camera module comprising a housing and a lens barrel supporting a lens;
   wherein, with said camera module mounted at the exterior portion of the vehicle, said lens is exposed at the exterior portion of the vehicle;
   a heating device configured to attach at an exterior of said lens barrel, said heating device comprising a heating element that at least partially circumscribes said lens barrel when said heating device is attached at said lens barrel;
   wherein said heating device includes an electrical lead configured to electrically connect to an electrical connector of the vehicle when said heating device is attached at said lens barrel and when said camera module is disposed at the exterior portion of the vehicle;
   a washer having a connector and fluid passageway, wherein said washer is configured to detachably attach at said camera module, and wherein, with said washer attached at said camera module and said camera module disposed at the exterior portion of the vehicle, said connector is configured for connection to a washer system of the vehicle such that, when the vehicle washer system is actuated, pressurized fluid flows through said fluid passageway and onto said lens;
   a temperature sensor for sensing a temperature at said camera module and generating an output indicative of the temperature at said camera module;
   a control configured for operating said heating device responsive to the output of said temperature sensor;
   wherein, responsive to the output of said temperature sensor being indicative of the temperature at said camera module being below a lower threshold level, said control operates said heating device to increase the temperature of said lens barrel of said camera module; and
   wherein, responsive to the output of said temperature sensor being indicative of the temperature at said camera module being above an upper threshold level, said control operates the washer system of the vehicle to flow fluid through the washer and/or through at least one fluid channel of said camera module to reduce the temperature of said camera module.

20. The vision system of claim 19, wherein, responsive to the output of said temperature sensor being indicative of the temperature at said camera module being above the upper threshold level, said control operates the washer system of the vehicle to flow fluid through at least one fluid channel of said housing of said camera module to reduce the temperature of said camera module.

* * * * *